United States Patent
Le-Khac

(10) Patent No.: US 7,501,532 B1
(45) Date of Patent: Mar. 10, 2009

(54) PROCESS FOR PRODUCING HYDROGEN PEROXIDE

(75) Inventor: Bi Le-Khac, West Chester, PA (US)

(73) Assignee: Lyondell Chemical Technology, L.P., Greenville, DE (US)

( * ) Notice: Subject to any disclaimer, the term of this patent is extended or adjusted under 35 U.S.C. 154(b) by 9 days.

(21) Appl. No.: 11/986,124

(22) Filed: Nov. 20, 2007

(51) Int. Cl.
*C01B 15/029* (2006.01)
*C07D 301/12* (2006.01)

(52) U.S. Cl. ........................ 549/531; 423/584
(58) Field of Classification Search ................ 423/584; 549/531
See application file for complete search history.

(56) References Cited

U.S. PATENT DOCUMENTS

| | | | |
|---|---|---|---|
| 4,410,501 A | 10/1983 | Taramasso et al. | |
| 4,428,923 A | 1/1984 | Kunkel et al. | |
| 4,833,260 A | 5/1989 | Neri et al. | |
| 4,954,325 A | 9/1990 | Rubin et al. | |
| 5,108,725 A | 4/1992 | Beck et al. | |
| 5,846,898 A | 12/1998 | Chuang et al. | |
| 6,077,498 A | 6/2000 | Diaz Cabañas et al. | |
| 6,114,551 A | 9/2000 | Levin et al. | |
| 6,168,775 B1 | 1/2001 | Zhou et al. | |
| 6,284,213 B1 | 9/2001 | Paparatto et al. | |
| 6,346,228 B1* | 2/2002 | Choudhary et al. | 423/584 |
| 6,524,547 B1 | 2/2003 | Nyström et al. | |
| 6,541,648 B1* | 4/2003 | Paparatto et al. | 549/531 |
| 6,649,140 B2 | 11/2003 | Paparatto et al. | |
| 7,105,142 B2 | 9/2006 | Paparatto et al. | |
| 2004/0054200 A1* | 3/2004 | Paparatto et al. | 549/531 |
| 2004/0184983 A1* | 9/2004 | Paparatto et al. | 423/584 |
| 2006/0099130 A1* | 5/2006 | Roque-Malherbe et al. | 423/335 |
| 2007/0027347 A1 | 2/2007 | Miller et al. | |

FOREIGN PATENT DOCUMENTS

BE 1001038 A7 6/1989
WO WO 2006/130295 A2 12/2006

OTHER PUBLICATIONS

Ma, Shuqi et al, "The direct synthesis of hydrogen peroxide from H2 and O2 over Au/TS-1 and application in oxidation of thiophene in situ", Chemistry Letters, 35(4), 428-429 (English) 2006.*

Xiao Tiancun et al., "Mechanism of sulfur poisoning on supported noble metal catalyst—the adsorption and transformation of sulfur on palladium catalysts with different supports", in *Catal. Lett.* (1992) pp. 287-296, vol. 12.

D. Beck et al., "Impact of sulfur on model palladium-only catalysts under simulated three-way operation", in *Appl. Catal., B Environmental* (1994) pp. 205-227, vol. 3.

H. Sato et al., "Preparation of ultrafine palladium particles in reverse micelles and application for hydrogenation catalysis", in *J. Che. Eng. of Japan* (2002) pp. 255-262, vol. 35 (3).

C. H. Bartholomew et al., "Chapter 2: Catalyst materials, properties, and preparation", in *Fundamentals of Industrial Catalytic Processes*, second edition, (2006) pp. 61-77, John Wiley & Sons.

J. Sherman, "Synthetic zeolites and other microporous oxide molecular sieves", in *Proc. Natl. Acad. Sci. USA* (Mar. 1999) pp. 3471-3478, vol. 96.

J. Kim et al., "Synthesis of MCM-48 single crystals", in *J. Chem. Soc., Chem. Commun.* (1998) pp. 259-260.

T. Kang et al., "Highly selective adsorption of $Pt^{2+}$ and $Pd^{2+}$ using thiol-functionalized mesoporous silica", in *Ind. Eng. Chem. Res.* (2004) pp. 1478-1484, vol. 43.

J. M. Smith, *Chemical Engineering Kinetics*, $3^{rd}$ edition, (1981) pp. 25-33, McGraw-Hill, Inc.

Ning Zhou et al., "Epoxidation of propylene by using $[\pi\text{-}C_5H_5NC_{16}H_{33}]_3[PW_4O_{16}]$ as catalyst and with hydrogen peroxide generated by 2-ethylanthrahydroquinone and molecular oxygen", in *Applied Catalysis A: General* (2003) pp. 239-245, vol. 250(2).

R. Szostak, "Non-aluminosilicate molecular sieves", in *Molecular Sieves: Principles of Synthesis and Identification* (1989) pp. 205-281, Van Nostrand Reinhold.

G. Vayssilov, "Structural and physicochemical features of titanium silicalites", in *Catal. Rev.-Sci. Eng.* (1997) pp. 209-251, vol. 39(3).

T. Maschmeyer et al., "Heterogeneous catalysts obtained by grafting metallocene complexes onto mesoporous silica", in *Nature* (Nov. 9, 1995) pp. 159-162, vol. 378.

P. Tanev et al., "Titanium-containing mesoporous molecular sieves for catalytic oxidation of aromatic compounds", in *Nature* (Mar. 24, 1994) pp. 321-323, vol. 368.

A. Corma et al., "Synthesis of Si and Ti-Si-MCM-48 mesoporous materials with controlled pore sizes in the absence of polar organic additives and alkali metal ions", in *J. Chem. Soc., Chem. Commun.* (1998) pp. 579-580.

D. Wei et al., "Catalytic behavior of vanadium substituted mesoporous molecular sieves", in *Catal. Today* (1999) pp. 501-511, vol. 51.

\* cited by examiner

*Primary Examiner*—Wayne Langel
(74) *Attorney, Agent, or Firm*—Yuanzhang Han

(57) ABSTRACT

A process comprising reacting hydrogen and oxygen in the presence of a noble metal, a thiol or thiolate, and a solvent is disclosed. The thiol or thiolate improves the hydrogen peroxide yield. The produced hydrogen peroxide may be used to oxidize organic compounds in the presence of an oxidation catalyst.

19 Claims, No Drawings

PROCESS FOR PRODUCING HYDROGEN PEROXIDE

FIELD OF THE INVENTION

The invention relates to a process for producing hydrogen peroxide from hydrogen and oxygen in the presence of a noble metal, a thiol or thiolate, and a solvent. The produced hydrogen peroxide may be used to oxidize organic compounds.

BACKGROUND OF THE INVENTION

Hydrogen peroxide is an important intermediate chemical useful in such applications as water treatment, pulp and paper bleaching, and organic synthesis. At present, the commercial process for producing hydrogen peroxide involves anthraquinone autooxidation (see, e.g., U.S. Pat. Nos. 4,428,923 and 6,524,547). The process requires numerous reaction and purification sections and uses a large amount of solvent. It is desirable for the chemical industry to develop more economical processes to produce hydrogen peroxide.

Hydrogen peroxide can be made by a direct reaction of hydrogen and oxygen in the presence of a catalyst. Considerable efforts have been devoted to develop a low-cost process to make hydrogen peroxide by the direct reaction. See, e.g., U.S. Pat. Nos. 6,168,775, 6,649,140, 5,846,898, 6,284,213, and 7,105,142. So far a commercially viable direct process is not yet available.

Sulfur compounds usually inhibit noble-metal-catalyzed reactions. See, e.g., *Catal. Lett.* 12 (1992) 287; *Appl. Catal., B.* 3 (1994) 205. For example, it has been reported that a thiol inhibits the hydrogenation activities of Pt or Pd. See *J. Chem. Eng. of Japan* 35(3) (2002) 255.

SUMMARY OF THE INVENTION

The invention is a process for producing hydrogen peroxide comprising reacting hydrogen and oxygen in the presence of a noble metal, a thiol or thiolate, and a solvent. The thiol or thiolate improves the hydrogen peroxide yield. The produced hydrogen peroxide may be used to oxidize organic compounds in the presence of an oxidation catalyst.

DETAILED DESCRIPTION OF THE INVENTION

In one aspect, the invention is a $H_2O_2$-producing process comprising reacting hydrogen and oxygen in the presence of a noble metal, a thiol or thiolate, and a solvent.

The process uses a noble metal. Suitable noble metals include gold, silver, platinum, palladium, iridium, ruthenium, osmium, rhenium, rhodium, and mixtures thereof. Preferred noble metals are Pd, Pt, Au, Re, Ag, and mixtures thereof. Palladium, gold, and their mixtures are particularly desirable.

The noble metal may be in the form of an elemental metal, an alloy, or a metal compound. Suitable noble metal compounds include nitrates, sulfates, halides (e.g., chlorides, bromides), carboxylates (e.g., acetate), and amine or phosphine complexes (e.g., palladium(II) tetraammine bromide, tetrakis(triphenylphosphine) palladium(0)).

The process uses a thiol or thiolate. A thiol is an organic molecule having a general formula RSH and containing a carbon-sulfur single bond, where R contains at least one carbon atom. R may be an alkyl or aryl group. R may contain substituents such as hydroxy, ketone, ester, amide, halide, cyano, nitro, amino, carboxylic acid or carboxylate, and the like. A thiolate is a deprotonated thiol. Thiols are also called mercaptans. Suitable thiols include methanethiol, ethanethiol, 1-propanethiol, 2-propanethiol, 1-butanethiol, 2-butanethiol, 2-methyl-1-propanethiol, 2-methyl-2-propanethiol, 1-dodecanethiol, cyclohexanethiol, benzenethiol (thiophenol), alpha-toluenethiol (benzyl mercaptan), alkyl mercaptopropionates, 3-mercaptopropionic acid, 2-mercaptoethanol, 1,2-ethanedithiol, and mercaptoacetic acid. An organic polymer carrying a thiol or thiolate group may be also used. Preferably, the sulfur atom of the thiol or thiolate group is bonded to an aliphatic carbon, e.g., in methanethiol, ethanethiol, 1-propanethiol, 2-propanethiol, 1-butanethiol, 2-butanethiol, 2-methyl-1-propanethiol, 2-methyl-2-propanethiol, 1-dodecanethiol, cyclohexanethiol, and their salts.

The thiol or thiolate may be introduced to the process separately from the noble metal. Alternatively, the thiol or thiolate may be mixed with a noble metal or a noble metal compound before being introduced to the process. A complex containing a noble metal and a thiol or thiolate may be used.

The process may be performed in the presence of a carrier. Standard catalyst carriers may be used. See Bartholomew, C. H. and Farrauto, R. J., *Fundamentals of Industrial Catalytic Processes*, second edition, John Wiley & Sons (2006) pp. 61-77. Suitable carriers, for example, include silicas, aluminas, titanias, silica-aluminas, silica-titanias, zeolites, clays, carbons, ion-exchange resins, and the like. Zeolites are porous crystalline solids with well-defined structures. Generally they contain one or more of Si, Ge, Al, B, P, or the like, in addition to oxygen (*Proc. Natl. Acad. Sci. USA*, 96 (1999) 3471). Zeolites having structures of MCM-22, MCM-41, and MCM-48 are also suitable for use. Examples of MCM-22, MCM-41, and MCM-48 zeolites are described in U.S. Pat. Nos. 4,954,325, 5,108,725, and *J. Chem. Soc., Chem. Commun.* (1998) 259).

The noble metal may be supported on the carrier. Many suitable methods may be used to support a noble metal on the carrier, including impregnation, adsorption, ion exchange, and precipitation. Typically a solution of a noble metal compound is used. The supported noble metal may be calcined in an oxygen-containing gas or an inert gas at a temperature in the range of from 60 to 900° C., more preferably in the range of from 150 to 600° C. Preferably, the supported noble metal is reduced with a reducing reagent prior to being introduced to the process. Hydrogen is a preferred reducing reagent. Suitable temperatures for hydrogen reduction range from 20 to 400° C., preferably from 50 to 200° C. Typically, the amount of noble metal present in a supported noble metal is in the range of from 0.01 to 20 wt. %, preferably 0.1 to 5 wt. %.

The thiol or thiolate may be tethered to the carrier through a chemical linkage (i.e., covalent chemical bonds) so that the carrier is functionalized with the thiol or thiolate group. Any suitable chemical linkage may be used to tether a thiol or thiolate to the carrier. For example, a hydroxy- or halide-substituted thiol (e.g., 2-mercaptoethyl chloride, 3-mercaptopropyl bromide) may react with carrier surface hydroxy groups to form ether linkages. A thiol containing a carboxylic acid or a carboxylic halide group (e.g., 2-mercaptoacetic chloride, 3-mercaptopropionic bromide) may be used to functionalize a carrier through ester functionalities. Trialkoxysilyl-substituted thiols (e.g., 3-mercaptopropyl trimethoxysilane, 2-mercaptoethyl trimethoxysilane) are particularly preferred functionalizing agents. It is known that a thiol group can be tethered to mesoporous silica by reacting it with 3-mercaptopropyl trimethoxysilane. See *Ind. Eng. Chem. Res.* 43 (2004) 1478.

It is presumed that the thiol or thiolate modifies the chemical activities of the noble metal so that it improves the rate and/or the selectivity of the reaction between hydrogen and oxygen to form hydrogen peroxide. Preferably, the thiol or thiolate and the noble metal are in close proximity to facilitate the interaction between them.

The amount of thiol or thiolate used is not critical. Generally, the molar ratio of the thiol or thiolate to the noble metal is in the range of from 1:9 to 9:1. Typically, the ratio is in the range of from 1:3 to 3:1.

The process uses oxygen and hydrogen. The molar ratio of hydrogen to oxygen ($H_2:O_2$) used is preferably within the range of 1:10 to 10:1. More preferably, the hydrogen to oxygen ratio is within the range of 1:2 to 4:1.

In addition to oxygen and hydrogen, an inert gas may be used. Preferably, the inert gas is nitrogen or a noble gas such as helium, neon, or argon. Methane, ethane, propane, and carbon dioxide can also be used. Because it is cheap and readily available, nitrogen is preferred. The inert gas advantageously provides a way to keep the oxygen and hydrogen levels in the reaction mixture outside the explosive limits.

The process uses a solvent. Suitable solvents dilute the gaseous reactants to a level effective to allow them to safely react to form hydrogen peroxide. Suitable solvents include, for example, hydrocarbons (e.g., propane, butane, isobutane, toluene, xylenes), halogenated hydrocarbons (e.g., dichloromethane, chlorobenzene, fluorinated hydrocarbons), nitriles (e.g., acetonitrile), and oxygenated solvents. Preferably, both hydrogen and oxygen have appreciable solubility in the solvent. Oxygenated solvents are preferred. The oxygenated solvent is preferably a liquid under the reaction conditions. Suitable oxygenated solvents are water, oxygen-containing hydrocarbons (alcohols, ethers, esters, ketones, and the like), carbon dioxide, and mixtures thereof. Preferred oxygenated solvents include lower aliphatic alcohols, especially $C_1$-$C_4$ alcohols such as methanol, ethanol, isopropyl alcohol, tert-butyl alcohol, and the like, and mixtures thereof. Fluorinated alcohols can also be used. Particularly preferred oxygenated solvents are water, methanol, carbon dioxide, and mixtures thereof. When carbon dioxide is the sole solvent or a cosolvent, it is preferably a liquid or a supercritical fluid under the reaction conditions.

The process may be performed in a batch, semi-batch, or a continuous mode. Preferably, the process is conducted in a continuous mode, where the reactants continuously flow in the reactor and the products continuously flow out of the reactor (Smith, J. M., Chemical Engineering Kinetics, 3rd edition, McGraw-Hill, Inc. (1981) pp. 25-33). If the thiol or thiolate is tethered to a carrier, the process is particularly suited for a continuous operation. The process may be performed in a fixed bed or a slurry. A continuous fixed-bed process is particularly preferred.

It is preferred to operate the process at a total pressure within the range of 10 to 3,000 psig. The reaction is performed at a temperature effective to give the desired hydrogen peroxide productivity, preferably at temperatures within the range of 0° C. to 100° C., more preferably from 20° C. to 80° C.

It may be advantageous to use a hydrogen peroxide stabilizer to minimize hydrogen peroxide decomposition. Suitable stabilizers include inorganic acids, organic acids, salts of the above acids, chelating agents, and the like. Examples of hydrogen peroxide stabilizers are nitric acid, sulfuric acid, phosphoric acid, hydrochloric acid, hydrobromic acid, pyrophosphoric acid, and their salts (e.g, sodium, potassium, ammonium salts). The stabilizer is typically added within the range of 0.1 to 1000, preferably 0.1 to 100, more preferably from 1 to 10, parts per million (ppm) based on the weight of reaction mixture.

In another aspect, the invention is an oxidation process comprising (a) a $H_2O_2$-producing step that comprises reacting hydrogen and oxygen in the presence of a noble metal, a thiol or thiolate, and a solvent to produce hydrogen peroxide; and (b) an oxidation step that comprises reacting an organic compound with the hydrogen peroxide produced from (a) in the presence of an oxidation catalyst.

The $H_2O_2$-producing step as described above produces a mixture comprising a noble metal, a thiol or thiolate, a solvent, and hydrogen peroxide. The noble metal and the thiol or thiolate may be separated from the mixture before it is used in the oxidation step. If the noble metal and the thiol or thiolate are in solid form, they may be separated by filtration. The reaction mixture may be used in the oxidation step without any separation.

The oxidation catalyst is any catalyst capable of catalyzing the oxidation of an organic compound with hydrogen peroxide. The oxidation catalyst typically includes a transition metal. Suitable transition metals are Group 3 to 11 metals. The first row of these metals includes Sc, Ti, V, Cr, Mn, Fe, Co, Ni, and Cu. The transition metal may be present in any suitable oxidation state as long as it is capable of catalyzing the reaction. Examples of suitable oxidation catalysts are: transition metal salts (e.g., $FeCl_3$, $Cr_2(SO_4)_3$), transition metal complexes (e.g., titanium(IV) tetra(isopropoxide), titanium bis(isopropoxide) acetylacetonate, methylrhenium (VII) trioxide), transition metal oxides (e.g., titania, tungsten (VI) oxide, niobium oxide), supported transition metal oxides (e.g., titanium oxide supported on silica, alumina, or other supports), mixed metal oxides (e.g., titania/silica, vanadia/silica), transition metal zeolites (e.g., titanium silicates, vanadium silicates), heteropolyacids (see, e.g., the catalyst described in *Applied Catalysis A: General*, 250(2) (2003) 239), and the like, and mixtures thereof. The oxidation catalyst may be soluble, partially soluble, or essentially insoluble in the reaction mixture under the reaction conditions.

Preferably, the oxidation catalyst comprises a transition metal zeolite. A transition metal zeolite (e.g., titanium zeolite, vanadium zeolite) is a crystalline material having a porous molecular sieve structure and containing a transition metal. Preferred transition metals are Ti, V, Mn, Fe, Co, Cr, Zr, Nb, Mo, and W. Particularly preferred are Ti, V, Mo, and W. Most preferred is Ti. The type of transition metal zeolite employed depends upon a number of factors, including the size and shape of the organic compound to be oxidized.

Titanium silicates (titanosilicates) are suitable oxidation catalysts. Preferably, they contain no element other than titanium, silicon, and oxygen in the lattice framework (see R. Szostak, "Non-aluminosilicate Molecular Sieves," in *Molecular Sieves: Principles of Synthesis and Identification* (1989), Van Nostrand Reinhold, pp. 205-282). Small amounts of impurities, e.g., boron, iron, aluminum, phosphorous, copper, and the like, and mixtures thereof, may be present in the lattice. The amount of impurities is preferably less than 0.5 wt. %, more preferably less than 0.1 wt. %. Preferred titanium silicates generally have a composition corresponding to the following empirical formula: $xTiO_2.(1-x)SiO_2$, where x is between 0.0001 and 0.5000. More preferably, the value of x is from 0.01 to 0.125. The molar ratio of Si:Ti in the lattice framework of the zeolite is advantageously from 9.5:1 to 99:1 (most preferably from 9.5:1 to 60:1). Particularly preferred titanium zeolites include the class of molecular sieves commonly known as titanium silicalites (see *Catal. Rev.-Sci. Eng.* 39(3) (1997) 209). Examples of these include TS-1 (titanium silicalite-1, a titanium silicalite having an MFI topology analogous to that of the ZSM-5 aluminosilicate), TS-2 (having an MEL topology analogous to that of the ZSM-11 aluminosilicate), and TS-3 (as described in Belgian Pat. No. 1,001,038). Titanium zeolites having framework structures isomorphous to zeolite beta, mordenite, ZSM-12, MCM-22, MCM-41, and MCM-48 are also suitable for use. Examples of Ti-MCM-22, Ti-MCM-41, and Ti-MCM-48 zeolites are described in U.S. Pat. Nos. 4,954,325, 6,077,498, and 6,114,551; Maschmeyer, T., et al, *Nature* 378(9) (1995) 159; Tanev, P. T., et al., *Nature* 368 (1994) 321; Corma, A., *J. Chem. Soc. Chem. Commun.* (1998) 579; Wei D., et al., *Catal. Today* 51 (1999) 501). The most preferred is TS-1.

In one preferred process, the carrier used in the $H_2O_2$-producing step is a transition metal zeolite. The same transition metal zeolite functions as the oxidation catalyst in the oxidation step. Accordingly, it is not necessary to use any additional oxidation catalyst in the oxidation step. The transition metal zeolite functions both as a carrier in the $H_2O_2$-producing step, and as the oxidation catalyst in the oxidation step.

The oxidation step may be performed using a continuous flow, semi-batch, or batch mode. It is advantageous to work at a pressure of 1-200 bars and at temperatures in the range of 0-250° C., more preferably, 20-200° C. Additional solvent and/or inert gas may be added to the reaction mixture. Suitable solvents for the $H_2O_2$-producing step may be used in the oxidation step.

A variety of organic compounds may be oxidized by the present process. They include olefins, alkanes, arenes, alcohols, aldehydes, ketones, thioethers, and the like.

In one preferred process, the organic compound is an olefin, and the oxidation product is an epoxide. Suitable olefins include any olefin having at least one carbon-carbon double bond, and generally from 2 to 60 carbon atoms. Preferably the olefin is an acyclic alkene of from 2 to 30 carbon atoms; the process is particularly suitable for epoxidizing $C_2$-$C_6$ olefins. More than one double bond may be present in the olefin molecule, as in a diene or triene. The olefin may be a hydrocarbon or may contain functional groups such as halogen, carboxy, hydroxy, ether, carbonyl, cyano, or nitro groups, or the like. In a particularly preferred process, the olefin is propylene and the epoxide is propylene oxide.

It may be advantageous to use a buffer in the epoxidation of an olefin. The buffer may typically be added to the solvent to form a buffer solution, or to the hydrogen peroxide solution. The buffer may also be added directly to the oxidation reaction mixture. The buffer is employed in the reaction to improve the reaction rate and/or selectivities. Buffers useful in this invention include any suitable salts of oxyacids, the nature and proportions of which in the mixture, are such that the pH of their solutions may preferably range from 3 to 10, more preferably from 4 to 9, and most preferably from 5 to 8. Suitable salts of oxyacids contain an anion and cation. The anion may include phosphate, carbonate, bicarbonate, sulfate, carboxylates (e.g., acetate), borate, hydroxide, silicate, aluminosilicate, and the like. The cation may include ammonium, alkylammonium (e.g., tetraalkylammoniums, pyridiniums, and the like), alkylphosphonium, alkali metal, and alkaline earth metal ions, or the like. Examples include $NH_4$, $NBu_4$, $NMe_4$, Li, Na, K, Cs, Mg, and Ca cations. The preferred buffer comprises an anion selected from the group consisting of phosphate, carbonate, bicarbonate, sulfate, hydroxide, and acetate; and a cation selected from the group consisting of ammonium, alkylammonium, alkylphosphonium, alkali metal, and alkaline earth metal ions. Buffers may preferably contain a combination of more than one suitable salt. Typically, the concentration of buffer in the solvent is from 0.0001 M to 1 M, preferably from 0.0005 M to 0.3 M. The buffer useful in this invention may include ammonium hydroxide which can be formed by adding ammonia gas to the reaction system. For instance, one may use a pH=12-14 solution of ammonium hydroxide to balance the pH of the reaction system. More preferred buffers include alkali metal phosphate, ammonium phosphate, and ammonium hydroxide.

Following examples illustrate the invention.

EXAMPLE 1

Pd/TS-1

Catalyst A

Titanium silicalite-1 (TS-1) is prepared by following procedures disclosed in U.S. Pat. Nos. 4,410,501 and 4,833,260. The TS-1 is calcined in air at 550° C. Spray-dried TS-1 is prepared by following procedures disclosed in U.S. Pat. Appl. Pub. No. 20070027347. It is calcined in air at 550° C. The calcined spray-dried TS-1 contains approximately 80 wt. % TS-1 and 20 wt. % silica.

Catalyst A is prepared by impregnating the calcined spray-dried TS-1 using a procedure disclosed in Example 1 of WO 2006/130295. Catalyst A contains 1.5 wt. % Ti and 0.1 wt. % Pd.

EXAMPLE 2

Pd/Au/Titania

Catalyst B

An aqueous slurry containing 17.5 wt. % titania is prepared with $TiO_2$ (Millennium Inorganic Chemicals S5-300B). The slurry is dried with a Mobile Minor Spray Dryer (Niro Inc.) configured for a two-point powder discharge and a rotary atomizer. The drying chamber has an inside diameter of 2.7 feet and a 2-feet cylindrical height with a 60-degree angle conical bottom. A Watson Marlow peristaltic pump (model 521CC) is use to feed the slurry to the atomizer wheel and control the exit temperature. The main product is collected at the bottom port of the drying chamber; fines are routed to the cyclone collector. Air is used as drying/process gas at a flow rate of 80 kg/h. The inlet temperature is set at 220° C. The atomizer wheel is set at 27,000 RPM. A Watson Marlow peristaltic pump is used to evaporate de-ionized water and control the exit temperature of the drying chamber to 95° C. The product is collected at the bottom of the drying chamber. Its mean mass diameter is 24 µm. The spray-dried titania is calcined in air at 700° C. The calcined spray-dried titania has a surface area of 40 $m^2/g$.

A round-bottom flask is charged with 25 mL of deionized water. To the water, 0.265 g of aqueous sodium tetrachloro aureate (20.74 wt. % gold), 0.275 g of disodium palladium tetrachloride, and 10 g of calcined spray-dried titania prepared above is added. To this slurry, 0.26 g of solid sodium bicarbonate is added. The slurry is agitated by rotating the flask at 25 rpm at a 45-degree angle for 4 h at 40° C. and filtered. The solids are washed once with 25 mL of deionized water. The solids are then calcined in air by heating at 10° C./min to 110° C. and holding at 110° C. for 4 h, then heating at 2° C./min to 300° C. and holding at 300° C. for 4 h. The calcined solids are washed with deionized water (25 mL×8). The solids are calcined in air by heating at 10° C./min to 110° C. for 4 h and then at 2° C./min to 550° C. for 4 h. The solids are then transferred to a quartz tube and treated with a hydrogen/nitrogen (mole ratio 4:96, 100 mL/h) gas at 100° C. for 1 h, followed by nitrogen for 30 min as the catalyst cooled from 100° C. to 30° C. The solids obtained (Catalyst B) contain 0.95 wt. % palladium, 0.6 wt. % gold, 58 wt. % titanium, and less than 20 ppm chloride.

EXAMPLE 3

Thiol-Functionalized Spray-Dried TS-1

Additive C

Spray-dried TS-1 (20 g), 3-mercaptopropyl trimethoxysilane (4.0 g), and toluene (80 g) are added to a 450-mL Parr reactor. The reactor is sealed and heated to 120° C. for 4 h under helium atmosphere. The solid is isolated by filtration, washed with toluene, then with acetone, and finally with ethanol. It is dried under vacuum at 60° C. for 4 h. The resulting material (Additive C) contains 0.66 wt. % sulfur.

COMPARATIVE EXAMPLE 4A AND EXAMPLES 4B AND 4C

Hydrogen Peroxide Production

Tests are conducted in a 450-mL multi-tube Parr reactor. Three test tubes (a, b, and c) in the reactor share the same gas phase. Each test tube has a magnetic stirring bar and all bars stir at the same rate. Test tubes a, b and c are each charged with 100 mg of Catalyst A. In addition, tubes b and c are charged with 10 and 50 mg of Additive C respectively. After 5.6 g of methanol/water (70/30 by weight) is added to each test tube, the reactor is closed and flushed with nitrogen. After the reactor contents are heated to 30° C., the reactor is charged with hydrogen to 100 psig, and then charged with a mixture of oxygen (4 mol %) in nitrogen to 1400 psig. The reaction mixture in each test tube is stirred magnetically at 30° C. for 1 h before it is cooled to room temperature. The concentration of hydrogen peroxide in each solution is determined by liquid chromatography (LC), shown in Table 1. It shows that the presence of a thiol-containing Additive C significantly increases the hydrogen peroxide yields.

COMPARATIVE EXAMPLE 5A AND EXAMPLES 5B AND 5C

Hydrogen Peroxide Production

Procedure of Example 4 is repeated except that three tubes a, b, and c are charged with 10 mg of Catalyst B. In addition, tubes b and c contain 20 mg and 50 mg of Additives C respectively. Test results are shown in Table 2.

TABLE 1

Hydrogen Peroxide Production

| Example | Catalyst | Hydrogen Peroxide [ppm] |
|---|---|---|
| 4a | Catalyst A, 100 mg | 367 |
| 4b | Catalyst A, 100 mg Additive C, 10 mg | 386 |
| 4c | Catalyst A, 100 mg Additive C, 50 mg | 1120 |

TABLE 2

Hydrogen Peroxide Production

| Example | Catalyst | Hydrogen Peroxide [ppm] |
|---|---|---|
| 5a | Catalyst B, 10 mg | 471 |
| 5b | Catalyst B, 10 mg Additive C, 20 mg | 583 |
| 5c | Catalyst B, 10 mg Additive C, 50 mg | 703 |

I claim:

1. A process comprising reacting hydrogen and oxygen in the presence of a noble metal, a thiol or thiolate, and a solvent to produce hydrogen peroxide.

2. The process of claim 1 wherein the noble metal is selected from the group consisting of gold, silver, platinum, palladium, iridium, ruthenium, rhenium, rhodium, osmium, and mixtures thereof.

3. The process of claim 1 wherein the noble metal is palladium, gold, or a palladium-gold mixture.

4. The process of claim 1 performed in the presence of a carrier.

5. The process of claim 1 wherein the noble metal is supported on the carrier.

6. The process of claim 4 wherein the thiol is tethered to the carrier.

7. The process of claim 4 wherein the carrier is selected from the group consisting of silicas, aluminas, titanias, silica-aluminas, silica-titanias, zeolites, clays, carbons, ion-exchange resins, and mixtures thereof.

8. The process of claim 1 wherein the noble metal is reduced prior to being introduced to the process.

9. The process of claim 8 wherein the noble metal is reduced with hydrogen.

10. The process of claim 1 wherein the solvent is selected from the group consisting of alcohols, ethers, esters, ketones, carbon dioxide, water, and mixtures thereof.

11. The process of claim 1 wherein the reaction is performed in the presence of a hydrogen peroxide stabilizer.

12. The process of claim 1 further comprising reacting an organic compound with the hydrogen peroxide in the presence of an oxidation catalyst.

13. The process of claim 12 wherein the oxidation catalyst is a transition metal zeolite.

14. The process of claim 12 wherein the oxidation catalyst is a titanium zeolite.

15. The process of claim 12 wherein the carrier is a transition metal zeolite.

16. The process of claim 15 wherein the oxidation catalyst is the transition metal zeolite.

17. The process of claim 16 wherein the transition metal zeolite is TS-1.

18. The process of claim 12 wherein the organic compound is an olefin.

19. The process of claim 12 wherein the organic compound is propylene.

\* \* \* \* \*